(12) United States Patent
Jayaram et al.

(10) Patent No.: US 10,009,596 B2
(45) Date of Patent: Jun. 26, 2018

(54) VIDEO PRODUCTION SHARING APPARATUS AND METHOD

(71) Applicant: Intel Corporation, Santa Clara, CA (US)

(72) Inventors: Sankar Jayaram, Pullman, WA (US); Vikas K. Singh, Bellevue, WA (US); Ritesh Kale, Pullman, WA (US); John Harrison, Palouse, WA (US); Charles DeChenne, Pullman, WA (US); Uma Jayaram, Pullman, WA (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/485,569

(22) Filed: Sep. 12, 2014

(65) Prior Publication Data

US 2015/0082364 A1  Mar. 19, 2015

Related U.S. Application Data

(60) Provisional application No. 61/877,879, filed on Sep. 13, 2013.

(51) Int. Cl.
*H04N 7/173* (2011.01)
*H04N 13/02* (2006.01)
(Continued)

(52) U.S. Cl.
CPC ....... *H04N 13/0282* (2013.01); *G11B 27/031* (2013.01); *G11B 27/32* (2013.01);
(Continued)

(58) Field of Classification Search
CPC combination set(s) only.
See application file for complete search history.

(56) References Cited

U.S. PATENT DOCUMENTS

| 7,683,937 B1* | 3/2010 | Blumenfeld | ....... H04N 5/23203 348/211.11 |
| 2004/0125133 A1* | 7/2004 | Pea | ................... G06F 17/30014 715/751 |

(Continued)

FOREIGN PATENT DOCUMENTS

| EP | 1871099 A2 | 12/2007 |
| WO | WO 2013/093176 | 6/2013 |
| WO | PCT/US2014/055518 | 12/2014 |

OTHER PUBLICATIONS

Extended European Search Report for Application No. 14843513.4, dated Feb. 1, 2017, 10 pages.
(Continued)

*Primary Examiner* — Alexander Gee
(74) *Attorney, Agent, or Firm* — Nicholson De Vos Webster & Elliott LLP

(57) ABSTRACT

A video production sharing apparatus is provided with a first computer having a processor, memory, and an input device, the memory having programs stored therein, the programs implemented through the processor and designed to cause the processor to: 1) access at least one video stream, 2) manipulate viewing perspective of the at least one video stream with the input device of the first computer to generate an individualized video, and 3) transfer a data file of user inputs from the input device used to manipulate the at least one video stream to create the individualized video that describes the individualized video of the at least one video stream. A method is also provided.

23 Claims, 10 Drawing Sheets

(51) Int. Cl.
*H04N 21/231* (2011.01)
*H04N 21/235* (2011.01)
*H04N 21/236* (2011.01)
*H04N 21/2387* (2011.01)
*H04N 21/4223* (2011.01)
*H04N 21/4402* (2011.01)
*H04N 21/462* (2011.01)
*H04N 21/643* (2011.01)
*H04N 21/84* (2011.01)
*H04N 21/2743* (2011.01)
*H04N 21/472* (2011.01)
*H04N 21/4788* (2011.01)
*H04N 21/81* (2011.01)
*H04N 5/262* (2006.01)
*G11B 27/031* (2006.01)
*G11B 27/32* (2006.01)
*H04N 5/232* (2006.01)

(52) U.S. Cl.
CPC ......... *H04N 5/2628* (2013.01); *H04N 21/231* (2013.01); *H04N 21/2353* (2013.01); *H04N 21/2387* (2013.01); *H04N 21/23614* (2013.01); *H04N 21/2743* (2013.01); *H04N 21/4223* (2013.01); *H04N 21/4402* (2013.01); *H04N 21/4622* (2013.01); *H04N 21/4788* (2013.01); *H04N 21/47205* (2013.01); *H04N 21/64322* (2013.01); *H04N 21/816* (2013.01); *H04N 21/84* (2013.01); *H04N 5/23238* (2013.01); *H04N 13/0203* (2013.01)

(56) References Cited

U.S. PATENT DOCUMENTS

| | | |
|---|---|---|
| 2005/0286759 A1 | 12/2005 | Zitnick, III et al. |
| 2008/0276181 A1* | 11/2008 | Moromisato ..... G06F 17/30174 715/740 |
| 2010/0149338 A1 | 6/2010 | Aggarwal et al. |
| 2010/0304731 A1* | 12/2010 | Bratton ................. H04N 5/232 455/420 |
| 2011/0026898 A1 | 2/2011 | Lussier et al. |
| 2011/0107369 A1 | 5/2011 | O'Brien et al. |
| 2012/0274750 A1 | 11/2012 | Strong |
| 2013/0222369 A1 | 8/2013 | Huston et al. |
| 2014/0150042 A1* | 5/2014 | Pacor ............... H04N 21/21805 725/116 |
| 2014/0259046 A1* | 9/2014 | Ren ................... H04N 21/4542 725/28 |

OTHER PUBLICATIONS

International Preliminary Report on Patentability for Application No. PCT/US2014/055518, dated Mar. 24, 2016, 10 pages.

* cited by examiner

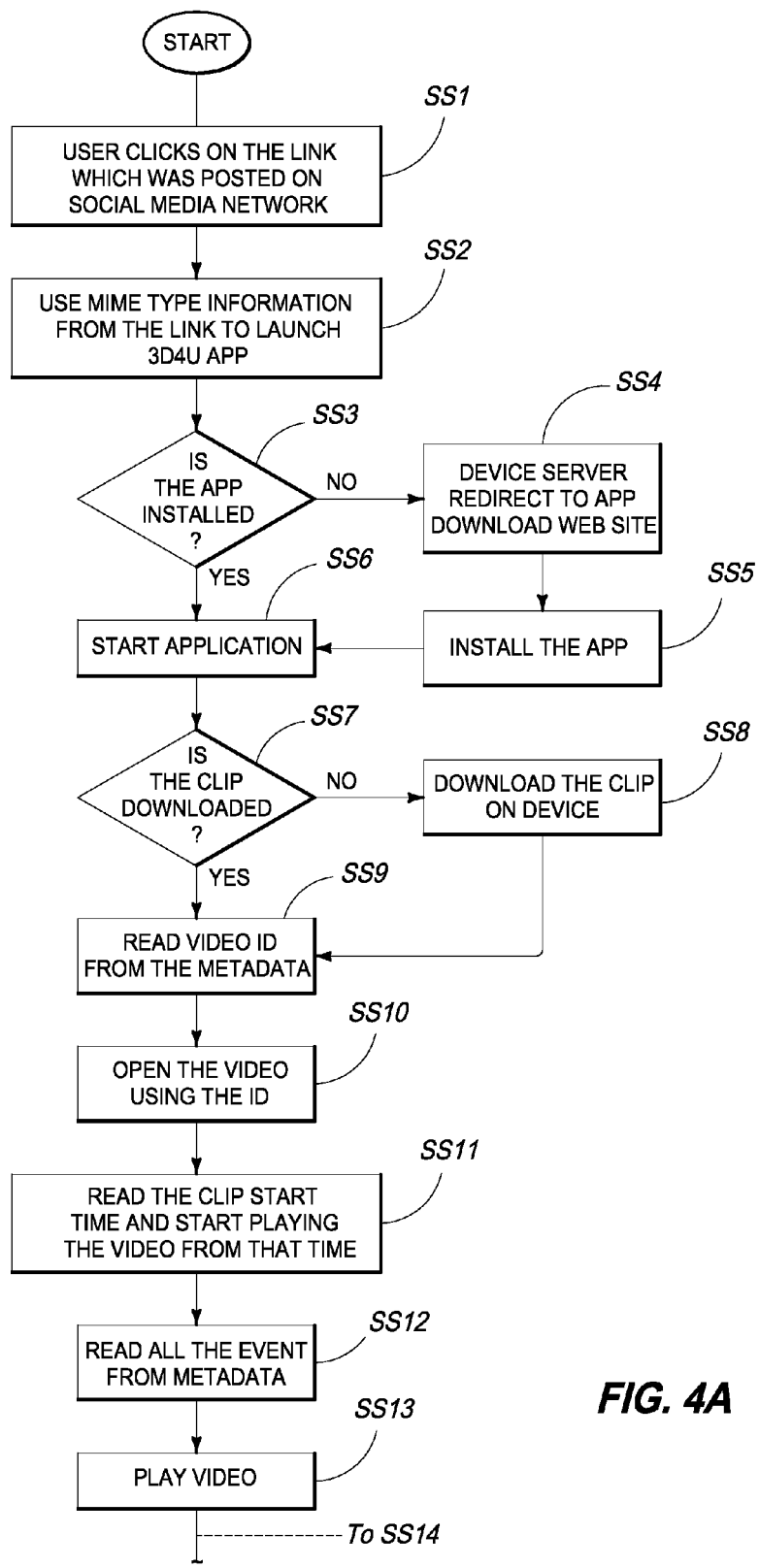

```xml
<?xml version="1.0" encoding="UTF-8"?>
<!DOCTYPE plist PUBLIC "-//Apple//DTD PLIST 1.0//EN" "http://www.apple.com/DTDs/PropertyList-1.0.dtd">
<plist version="1.0">
<array>    ◄── A0
    <array>    ◄── A1
        <dict>    ◄── A2
            <key>CAMERA_TAG</key>    ◄── A3
            <integer>100</integer>    ◄── A4
            <key>CURRENT_PLAY_BACK_TIME</key>    ◄── A5
            <real>17.910487452000002</real>    ◄── A6
            <key>EVENT_ID</key>    ◄── A7
            <integer>999</integer>    ◄── A8
            <key>OFFSET</key>    ◄── A9
            <string>{450.5, 0}</string>    ◄── A10
            <key>PLAYSTATE</key>    ◄── A11
            <true/>    ◄── A12
            <key>RECORDED_DEVICE_CONTENT_TRANSFORMATION</key>    ◄── A13
            <string>{896, 748}</string>    ◄── A14
            <key>SharedAppVersion</key>    ◄── A15
            <string>2.0</string>    ◄── A16
            <key>Videoid</key>    ◄── A17
            <string>513</string>    ◄── A18
            <key>ZOOM</key>    ◄── A19
            <real>1</real>    ◄── A20
        </dict>    ◄── A21
        <dict>
            <key>CURRENT_PLAY_BACK_TIME</key>    ◄── A22
            <real>19.883273696</real>    ◄── A23
            <key>EVENT_ID</key>    ◄── A24
            <integer>109</integer>    ◄── A25
            <key>OFFSET</key>    ◄── A26
            <string>{453.5, 0}</string>    ◄── A27
            <key>TIME</key>    ◄── A28
            <real>1.7666667588055134</real>    ◄── A29
        </dict>    ◄── A30
        <dict>
            <key>CURRENT_PLAY_BACK_TIME</key>    ◄── A31
            <real>19.899590493000002</real>    ◄── A32
            <key>EVENT_ID</key>    ◄── A33
            <integer>109</integer>    ◄── A34
            <key>OFFSET</key>    ◄── A35
            <string>{457, 0}</string>    ◄── A36
            <key>TIME</key>    ◄── A37
            <real>1.8000000938773155</real>    ◄── A38
        </dict>    ◄── A39
        <dict>
            <key>CURRENT_PLAY_BACK_TIME</key>    ◄── A40
            <real>19.915203333000001</real>    ◄── A41
            <key>EVENT_ID</key>    ◄── A42
            <integer>109</integer>    ◄── A43
            <key>OFFSET</key>    ◄── A44
            <string>{460.5, 0}</string>    ◄── A45
            <key>TIME</key>    ◄── A46
            <real>1.8000000938773155</real>    ◄── A47
        </dict>    ◄── A48
        <dict>
            <key>CURRENT_PLAY_BACK_TIME</key>    ◄── A49
            <real>23.910301570000001</real>    ◄── A50
            <key>EVENT_ID</key>    ◄── A51
            <integer>100</integer>    ◄── A52
            <key>OFFSET</key>    ◄── A53
            <string>{1548.03, 335.527}</string>    ◄── A54
```

FIG. 8

VIDEO PRODUCTION SHARING APPARATUS AND METHOD

TECHNICAL FIELD

This disclosure pertains to systems and methods for recording a video production and viewing the video production at a remote location. More particularly, this disclosure relates to recording of a video production by recording meta data related to one or more panoramic or large field-of-view video feeds and recreating the video production using the recorded meta data with video production data and an original video feed coming from a different source.

BACKGROUND

Techniques are known for capturing and recording video. Most techniques involve a video capture system that captures video and generates a video stream (or feed) from a video camera. Viewers are limited by the camera orientation, location, and zoom realized by the video camera operator(s). Improvements are needed to enable viewers to tailor large field-of-view video streams into unique video productions that can be shared and recreated by other users.

SUMMARY OF THE INVENTION

An apparatus and method are provided for recording a video production from one or more panoramic and/or high resolution video feeds and recreating the video production at a remote location using meta data, production data, and video feed from a remote source.

An array of monoscopic video detectors, as well as an array of stereoscopic pairs of video detectors, are provided in one or more unique locations (or in motion) to capture information over time from a surrounding environment, such as monoscopic images or stereoscopic images, and audio inputs from ranges exceeding that for a single video detector or stereoscopic pair of video detectors. Video output from one or more video detectors is accessed at user interface by a user to generate a video production from the one or more large field-of-view video feeds. The generated video production is then recreated by the same or another user at a remote location using the recorded meta data related to the video feed(s) and production data and the original video feed(s) coming from a source different than the user.

According to one aspect, a video production sharing apparatus is provided with a first computer having a processor, memory, and an input device, the memory having programs stored therein, the programs implemented through the processor and designed to cause the processor to: 1) access at least one video stream, 2) manipulate viewing perspective of the at least one video stream with the input device of the first computer to generate an individualized video, and 3) transfer a data file of user inputs from the input device used to manipulate the at least one video stream to create the individualized video that describes the individualized video of the at least one video stream.

According to another aspect, a method is provided for sharing a video production, comprising: providing at least one video stream and at least one computer; accessing at least one video stream at the at least one computer; manipulating viewing perspective of the at least one video stream with an input device of the at least one computer to generate an individualized video; and rendering user inputs from the input device used to manipulate the at least one video stream to create the individual video in the form of a data file that describes the individual video of the at least one video stream.

According to yet another aspect, an apparatus and a method are provided for recording a video production from one or more panoramic and/or high resolution video feeds and recreating the video production at a remote location using meta data, production data, and video feed from a remote source.

BRIEF DESCRIPTION OF THE DRAWINGS

Preferred embodiments of the disclosure are described below with reference to the following accompanying drawings.

FIG. 4 is a flowchart showing the steps involved in sharing a video clip using system 10 of FIG. 1. FIGS. 4A and 4B are flowchart sections used to assemble the flowchart of FIG. 4.

FIG. 8 is a sample of selected segments of metadata for individual captured image sub-spaces (or sub-regions) created by a first user wanting to share a personal user video with themself or with a second user.

DETAILED DESCRIPTION OF THE PREFERRED EMBODIMENTS

This disclosure is submitted in furtherance of the constitutional purposes of the U.S. Patent Laws "to promote the progress of science and useful arts" (Article 1, Section 8).

Embodiments disclose an apparatus and method for receiving a video stream from a plurality of Panoramic Video Camera Heads or from a local storage disk, storing the video data in a local memory buffer, manipulating the video to generate personal videos that can be shared through the Internet and social media, and viewing the generated personal videos. An apparatus and method are provided for recording a video production from one or more panoramic and/or high resolution video feeds and recreating the video production at a remote location using meta data, production data, and video feed from a remote source.

For the case of image inputs, stereoscopic pairs of video cameras are provided in an array. A combined unit of monoscopic or stereoscopic video detectors with processing circuitry to create panoramic image data for panoramic videos is referred to as a Panoramic Video Camera Head. The video data from a Panoramic Video Camera Head can be streamed to a viewer or recorded in computer memory or storage and retrieved by a viewer and viewed using user interface devices for control.

Various embodiments described herein are described with reference to figures. However, certain embodiments may be practiced without one or more of these specific details, or in combination with other known methods and configurations. In the following description, numerous specific details are set forth, such as specific configurations and methods, etc., in order to provide a thorough understanding of the present invention. In other instances, well-known construction techniques and methods have not been described in particular detail in order to not unnecessarily obscure the present invention. Reference throughout this specification to "one embodiment" or "an embodiment" means that a particular feature, configuration, composition, or characteristic described in connection with the embodiment is included in at least one embodiment of the invention. Thus, the appearances of the phrase "in one embodiment" or "an embodiment" in various places throughout this specification are not necessarily referring to the same embodiment of the invention. Furthermore, the particular features, configurations, compositions, or characteristics may be combined in any suitable manner in one or more embodiments.

Figure 1:
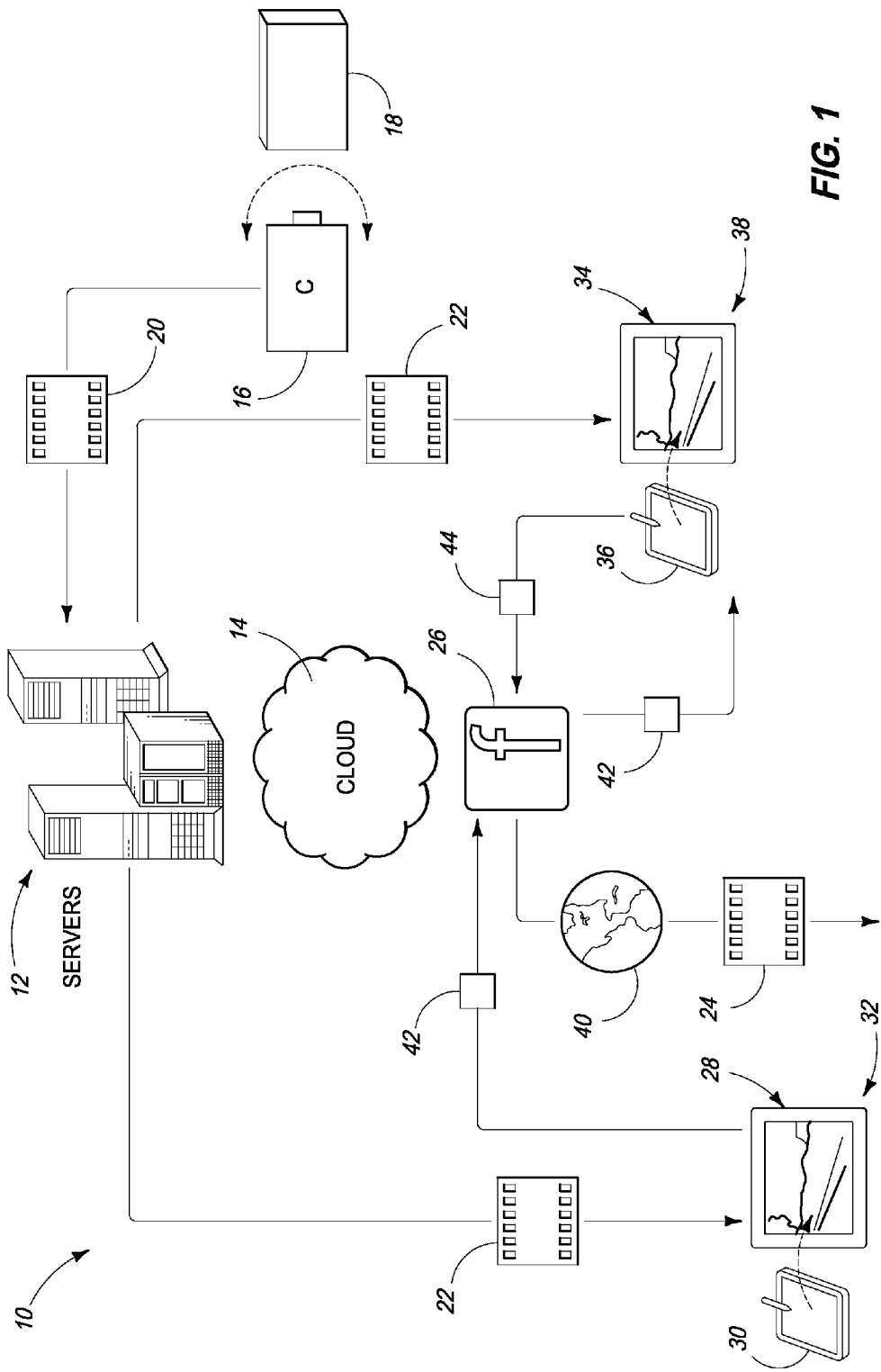
FIG. 1 is a schematic diagram showing an apparatus and method for recording a video production from one or more panoramic and/or high resolution video feeds and recreating the video production at a remote location using meta data, production data, and video feed from a remote source.

FIG. 1 provides an apparatus 10 and a method for recording a video production from one or more panoramic and/or high resolution video feeds and recreating the video production at a remote location using meta data, production data, and video feed from a remote source. A recording device 16 such as a camera or an array of cameras (or stereoscopic camera pairs) captures one or more image objects 18 in a scene being captured by recording device 16. One or more recording devices 16 capture video/media about object 18 and send it to one or more server 12. A video stream/video clip/media entity 20 is generated by the camera(s) 16.

As shown in FIG. 1, one or more servers 12 receive video stream 20. A video/media clip 22 residing on server 12 is provided to a first user 32 at a portable electronic device, or tablet computer 32. Tablet computer 28 has an input device 30. Tablet computer 28 is an entity on a mobile device that gets media in the form of video feed or video clips from servers 12. Having received the media from servers 12, mobile device 28 can now create and record a self-produced clip or segment, which is defined by meta data 42.

User interface 30 of FIG. 1 shows an interaction device that allows interaction with the panoramic video 22. User interface 30 of device 28 provides individual control of the view along with the concurrent recording of this unique individualized clip 24 that captures the entity's unique viewpoint. The individualized clip 24 is saved and shared. Upon saving and sharing, what is shared is meta data 42 which is component #42. Meta data 42 is sent to the cloud 14 (distributed across the Internet) for storage in any kind of data store provided in the cloud 14. In addition, metadata 42 can go to social media such as Facebook® 26. Subsequently, it goes to the Internet 40 for sharing and distribution.

Through Internet 40, the resulting video 24 rendered via meta data 42 goes out to everybody capable of receiving it over the Internet.

Another user 38 on another mobile device 34 (and user input device 36) can receive meta data 42 and video clip 22 which enables user 38 to see the self-produced clip or segment from user 32. User (or entity) 38 receives meta data 42 created by the mobile device 28 and in addition receives video clip 22 obtained from server(s) 12. Having video clip 22 directly from server 12 and metadata 44 allows efficiencies in significantly reducing the time and data requirements for the one-to-many sharing activity of individually generated modifications to the video/media. Entity 38 using device 36 has the capability to further modify the clip 24 and send back meta data 44 to the social media site and the cloud for subsequent sharing and storage.

Figure 2:
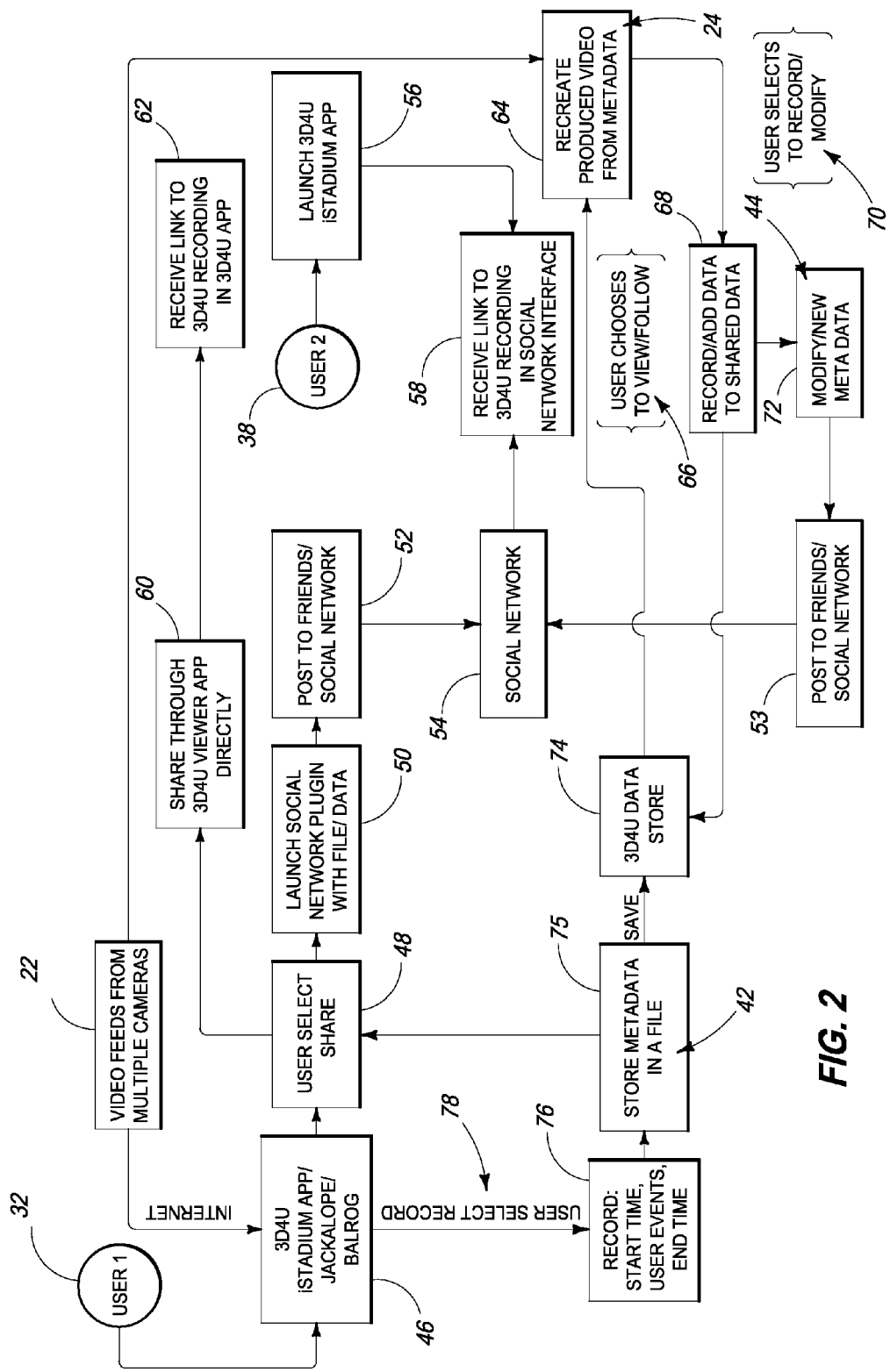
FIG. 2 is a functional block diagram showing implementation of the apparatus and method of FIG. 1 enabling a first user to generate and record a personal video production, and further enabling sharing by the first user with a second user meta data that combines with production data and a video feed to enable the second user to access and/or modify the personal video production.

As shown in FIG. 2, an entity, or user 32 has access to a client application 46. Video feed from multiple cameras 22 is accessed using this client application. Using the application, the entity or user selects the record option 78. The recorded packet 76 consists of meta data such as start time, user events, and end time. Meta data is stored in a storage mechanism such as a file 75. This lends itself to several choices including the choice to save the data in a dedicated data store 74 or to allow the entity/user to select the option to share this recorded unit 48.

Upon sharing, a network plug-in to the social data is launched with the metadata file 50, as shown in FIG. 2. This metadata is posted to friends and social network 52 and goes to the social network 54. Another option is to bypass the social network and go to the dedicated app such as 3D4U viewer 60. This app sends out a link 62 to the recording in the app used by another user 38.

An entity, or user 38 of FIG. 2 also launches a client application 56. This client application receives the link to the recording in the app 62 and/or receives a link to the recording in the social network interface 58. The app recreates produced video from metadata 24. This is done using video feed from multiple cameras 22 and the file or equivalent storage mechanism for the metadata 74.

Entity 38 can now have several choices, as shown in FIG. 2, including the following: One choice is to view and follow 66. Another choice is to further add data to the shared data 68. This is sent to the storage mechanism such as a file 74. A third choice is to modify 70. This creates new metadata 72. This new metadata 72 can be posted to friends and on social network 53 and sent to social network 54.

Figure 3:
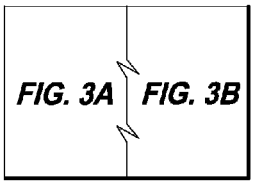
FIG. 3 is a flowchart showing the steps involved in recording and creating a video clip using system 10 of FIG. 1.

FIG. 3 forms a process flow diagram showing the logic processing for recording and creating a video clip using system 10 (of FIG. 1). More particularly, FIG. 3 illustrates logic processing used to record and create a clip.

As shown in FIG. 3, a logic flow diagram illustrates the steps implemented by the system of Applicant's invention when recording a video clip.

In step "S1", an individual requests to start recording the video using a visually perceptible medium. Various forms of a visually perceptible medium are envisioned, including links located within a user interface, a banner, a button, a clickable icon, a clickable graphic, or a hypertext link located on the user interface. After performing Step "S1", the process proceeds to Step "S2".

In Step "S2", a metadata is created for the video clip in the device memory. Metadata can be any form of data storage including one or more combinations of Enumerations, Dictionaries, Hashtable, Arrays, Lists or Binary Trees or file. After performing Step "S2", the process proceeds to Step "S3".

In step "S3", the process gets the current playback time and adds it in the metadata which was created in Step "S2". It can either be added as a string or an integer or a binary form. After performing Step "S3", the process proceeds to Step "S4".

In step "S4", the process starts recording or capturing all the user events. The process might set a value to a variable to indicate that the recording has started. The variable can be any form of data storage like string, Boolean, integer or binary. After performing Step "S4", the process proceeds to Step "S5".

In step "S5", the process creates data storage for saving the events. Various forms of storage are envisioned, including one or more combinations of Enumerations, Dictionaries, Hashtable, Arrays, Lists or Binary Trees or file. After performing Step "S5", the process proceeds to Step "S6".

In step "S6", the process starts a timer to keep track of the recording time. This step might either be initializing a number or initializing an object of a class which provides the functionality to keep track of time duration. After performing Step "S6", the process proceeds to Step "S7".

In step "S7", the process queries if the recording is in progress. The process might get the value of a variable which was set in Step "S4" and it has the same value as set in Step "S4" then it indicates that the recording is in progress else the recording has stopped. For example, if a user stops the recording then the process might set a Boolean which was set to "true" in Step "S4" to false to indicate that the recording has been stopped. The user can stop the recording by either a particular physical interaction with the device or an interaction through eye with the device as in Samsung devices. For example, if a user clicks on the recording button again after already starting the recording then recording variable of the process will be set to indicate that the recording has stopped. After Step "S7", if the recording is in progress then the process proceeds to Step S8 else it proceeds to Step "S16".

In step "S8", the process queries if a user event has occurred. User event can be any type of physical interaction or interaction through eye like in Samsung devices by the user with the device. The event might result in pause, play, forward, rewind, camera switch, zoom or pan. For example, if the user clicks on button with the label 'Pause' then it might result in Pause of the video and the process will capture this event. If a user event occurs then the process proceeds to Step S9 else it proceeds again to Step "S7".

In Step "S9", the process creates data storage for the event which occurred in Step "S8". Various forms of Data storage are envisioned, including one or more combinations of Enumerations, Dictionaries, Hashtable, Arrays, Lists or Binary Trees or file. After performing Step "S9", the process proceeds to Step "S10".

In Step "S10", the process saves the information related to the event to the data storage created in the Step "S9". The information might include the time when the event took place along with the details to uniquely identify the type of event. For example, the process might get the current playback time of the video along with the current duration of recording and the event id. After performing Step "S10", the process proceeds to Step "S11".

In Step "11", the process queries if the event belongs to the list of user events which causes the screen to Pan. If it results in the screen to Pan then the process proceeds to Step "S14" else it proceeds to Step "S12". For example, if the user slides his finger horizontally either to right or left and if this gesture belongs to the user events list which causes Pan then the process moves to Step "S14".

In Step "S14", the process saves the offset values (X and Y) to the event data storage which was created in Step "S9". After performing Step "S14", the process proceeds to Step "S15".

In Step "12", the process queries if the event belongs to the list of user events which causes the screen to Zoom. If it results in the screen to Zoom then the process proceeds to Step "S13" else it proceeds to Step "S15". For example, if the user slides his two fingers away from each other and if this gesture belongs to the user events list which causes the screen to Zoom then the process moves to Step "S13".

In Step "S13", the process saves the zoom scale and offset values (X and Y) to the event data storage which was created in Step "S9". After performing Step "S13", the process proceeds to Step "S15".

In Step "S15", the process adds the event storage which was created in Step "S9" to the data storage which was created in Step "S5" for all the events. After performing Step "S15", the process proceeds again to Step "S7".

In Step "S16", the process provides various options to the user if the user stops the recording. The options include save, share or discard. Each of the options is provided using a visually perceptible medium. Various forms of a visually perceptible medium are envisioned, including links located within a user interface, a banner, a button, a clickable icon, a clickable graphic, or a hypertext link located on the user interface. After Step "S16", the process proceeds to Step "S17" if the user selects to Save the clip or to Step "S18" if the user selects to Share the clip or to Step "S19" if the user selects to Discard the clip.

In Step "S17", the process identifies that the metadata related to the clip needs to be saved. After Step "S17", the process proceeds to Step "S20".

In Step "S18", the process shares the recording. After Step "S18", the process proceeds to Step "S22".

In Step "S19", the process discards the recording. After Step "S19", the process proceeds to Step "S19.5" where the memory is cleared of the recording (or it is erased).

In Step "S20", the process saves the metadata in a file on the device disk. It is understood that the file can be of any type, including xml, text, word, or excel file. After performing Step "S20", the process proceeds to Step "S21".

Figure 3A:
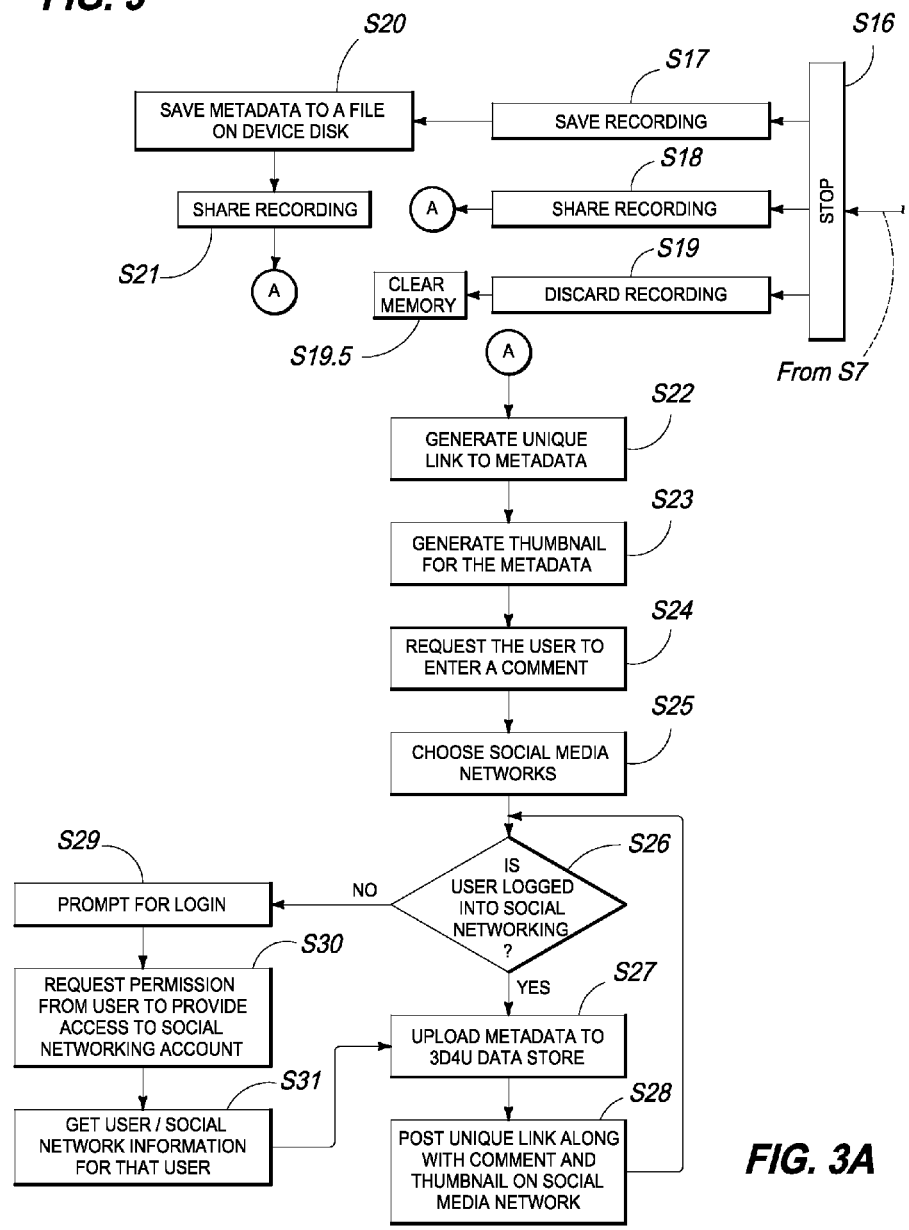
FIGS. 3A and 3B are flowchart sections used to assemble the flowchart of FIG. 3.
Figure 3B:
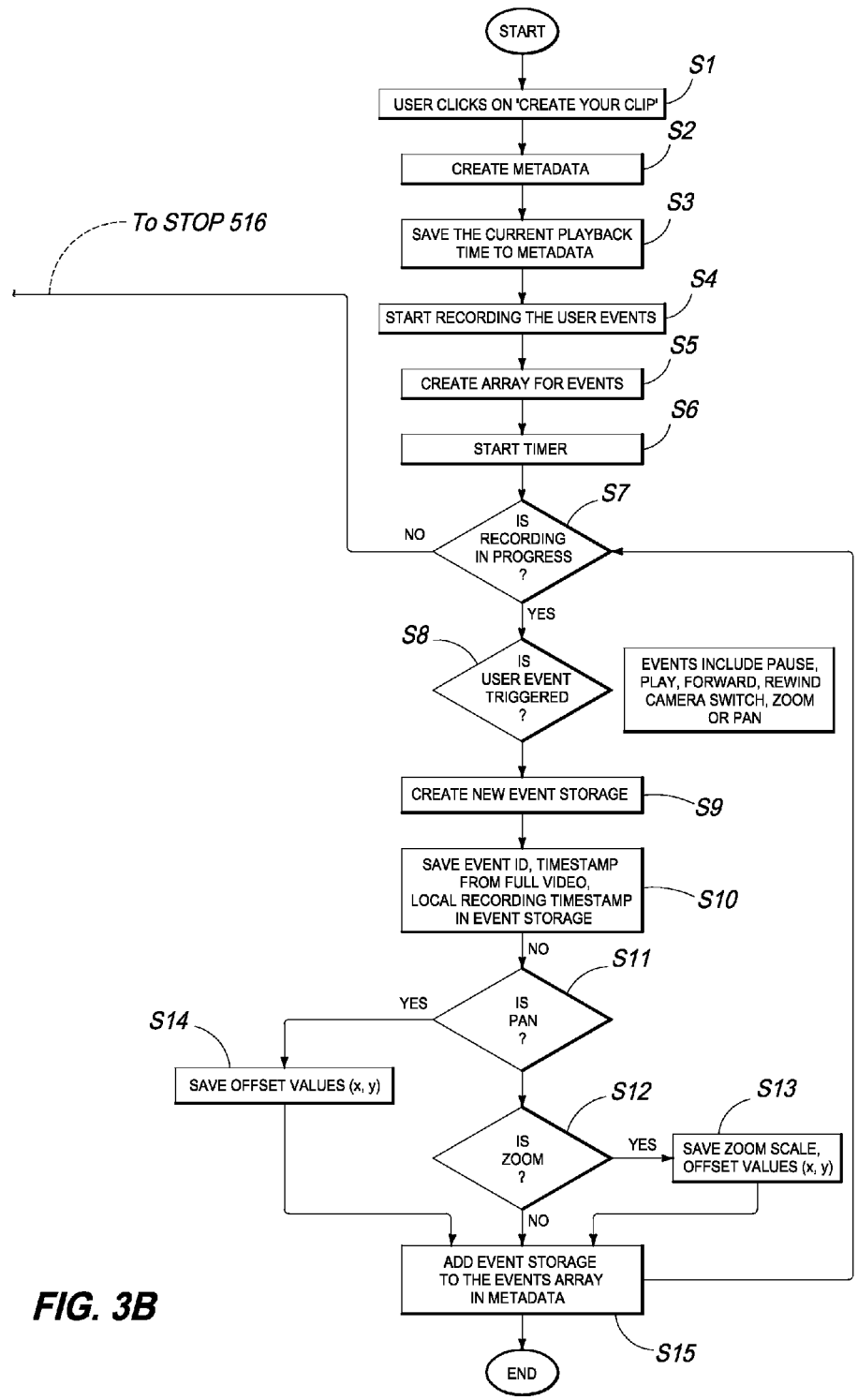

In step "S21", an individual requests to share the video clip using a visually perceptible medium. Various forms of a visually perceptible medium are envisioned, including links located within a user interface, a banner, a button, a clickable icon, a clickable graphic, or a hypertext link located on the user interface. After performing Step "S21", the process proceeds to the sharing process as shown in FIG. 3A.

FIG. 3 forms a process flow diagram showing the logic processing for sharing a video clip using system 10 (of FIG. 1). More particularly, FIG. 3 illustrates logic processing used to share a video clip.

Figure 4B:
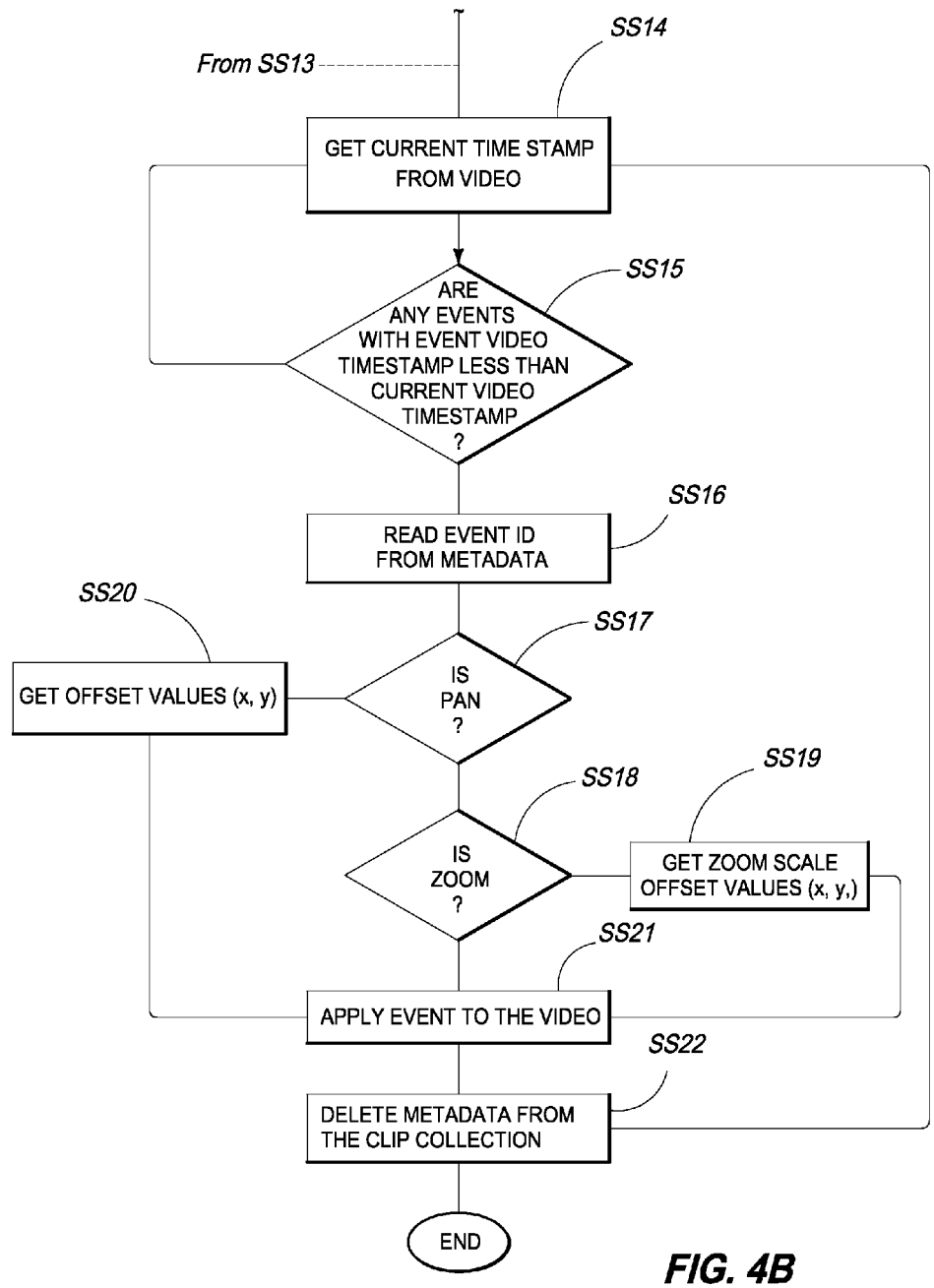

As shown in FIG. 4, a logic flow diagram illustrates the steps implemented by the system of Applicant's invention when sharing a video clip.

In step "S22", the process sends the metadata to the shared server and receives a unique link for the share the video clip. The metadata can be sent to the shared server in various forms including string or xml. After performing Step "S22", the process proceeds to Step "S23".

In Step "S23", the process generates a thumbnail for the clip which is shared. After performing Step "S23", the process proceeds to Step "S24".

In step "S24", the process requests the user to enter a comment for the video clip and saves the comment in the memory. The comment might be requested by visually perceptible medium. Various forms of a visually perceptible medium are envisioned, including textbox. After performing Step "S24", the process proceeds to Step "S25".

In step "S25", the process requests the user to select the social networking media on which the user would like to share the clip. The options will include all the available social media including Facebook®, Twitter®, Orkut® or Google+®. After performing Step "S25", for each of the selected social media network the process proceeds to Step "S26".

In step "S26", the process queries the social media network if the user has already logged in using their API functionalities. For example, the process will query Facebook® if a user is currently logged in using Facebook® API. After performing Step "S26", if a user is logged-in then the process proceeds to Step "S27" else the process proceeds to Step "S29".

In step "S29", the process prompts the user to login to the social media network. The user name and password to enter will depend on the social media network. For example, the process will request the Facebook® login ID and password for sharing the clip on Facebook®. After performing Step "S29", the process proceeds to Step "S30".

In step "S30", the process requests the user for permission for the 3D4U application to the social media network. After Step "S30", the process proceeds to Step "S31".

In Step "S31", the process requests the user or social network information from the social networking media. This information can include profile picture, list of friends of the user or UserID. After performing Step "S31", the process proceeds to Step "S27".

In Step "S27", the process uploads the user information to the 3D4U shared server. After performing Step "S27", the process proceeds to Step "S28".

In Step "28", the process posts the unique link along with the comment and thumbnail on the social media network. After performing Step "S28" for each of the selected social media networks, the process ends.

FIG. 4 forms a process flow diagram showing the logic processing for playing the video clip which was posted on social media network using system 10 (of FIG. 1). More particularly, FIG. 4 illustrates logic processing used to play a video clip which was posted on a social media network.

As shown in FIG. 4, a logic flow diagram illustrates the steps implemented by the system of Applicant's invention when playing a video clip which was posted on social media network.

In step "SS1", an application user requests to play the video clip using link presented as visually perceptible medium. Various forms of a visually perceptible medium are envisioned, including links located within a user interface, a banner, a button, a clickable icon, a thumbnail, a clickable graphic, or a hypertext link located on the user interface. After performing Step "SS1", the process proceeds to Step "SS2".

In Step "SS2", the process uses mime type information from the link to launch 3D4U application. After performing Step "SS2", the process proceeds to Step "SS3".

In step "SS3", the process queries the device if the application is already installed on the device. After performing Step "SS3", if the application is installed then the process proceeds to Step "SS6" else the process proceeds to Step "SS4".

In step "SS4", the process redirects the device server to 3D4U application download website. The download website will depend on the device. For example, on an Apple® device the process redirects to Apple® 3D4U application. After performing Step "SS4", the process proceeds to Step "SS5".

In step "SS5", the process installs the 3D4U application on the device. After performing Step "SS5", the process proceeds to Step "SS6".

In step "SS6", the process starts the 3D4U application. After performing Step "SS6", the process proceeds to Step "SS7".

In step "SS7", the process queries if the clip is already downloaded on the device. After Step "SS7", if the clip is already downloaded then it proceeds to Step "SS9" else the process proceeds to Step "SS8".

In Step "SS8", the process requests the clip metadata with the application shared server and downloads it on the device. After performing Step "SS8", the process proceeds to Step "SS9".

In Step "SS9", the process reads the full video ID from the metadata which was downloaded in Step "SS8". After performing Step "SS9", the process proceeds to Step "SS10".

In Step "SS10", the process opens the full video based on the full Video ID. After performing Step "SS10" the process proceeds to Step "SS11".

In Step "SS11", the process gets the clip start time from the metadata. After performing Step "SS11" the process proceeds to Step "SS12".

In Step "SS12", the process gets all the events from the metadata of the clip. After performing Step "SS12" the process proceeds to Step "SS13".

In Step "SS13", the process starts playing the full video from the start time which was obtained in Step "SS11". After performing Step "SS13" the process proceeds to Step "SS14".

In step "SS14", the process requests the current time stamp of the video. After performing Step "SS14", the process proceeds to Step "SS15".

In step "SS15", the process queries the events collection if an event start time is less than the current video time obtained in Step "SS14". After performing Step "SS15", if there is an event which has a start time less than the current video time then it will read the event data storage and proceeds to Step "SS16" else the process proceeds to Step "SS14".

In step "SS16", the process reads the event type based on the event id which is available from the event data storage obtained in Step "SS15". After performing Step "SS16", the process proceeds to Step "SS17".

In Step "SS17", the process queries if the event belongs to the list of user events which causes the screen to Pan. If it results in the screen to Pan then the process proceeds to Step "SS20" else it proceeds to Step "SS18".

In Step "SS20", the process reads the offset values (X and Y) from the event data storage which was obtained in Step "SS15". After performing Step "SS20", the process proceeds to Step "SS21".

In Step "SS18", the process queries if the event belongs to the list of user events which causes the screen to Zoom. If it results in the screen to Zoom then the process proceeds to Step "SS19" else it proceeds to Step "SS21".

In Step "SS21", the process applies the event to the video. For example, if the event is of type zoom then the process applies the offset and zoom scale values and then zooms the screen. After performing Step "SS21", the process proceeds to Step "SS22".

In Step "SS22", the process deletes the event storage which was obtained in Step "SS15" from the collection of events data storage which was read in Step "SS12". After performing Step "SS22", the process proceeds again to Step "SS14".

Figure 5:
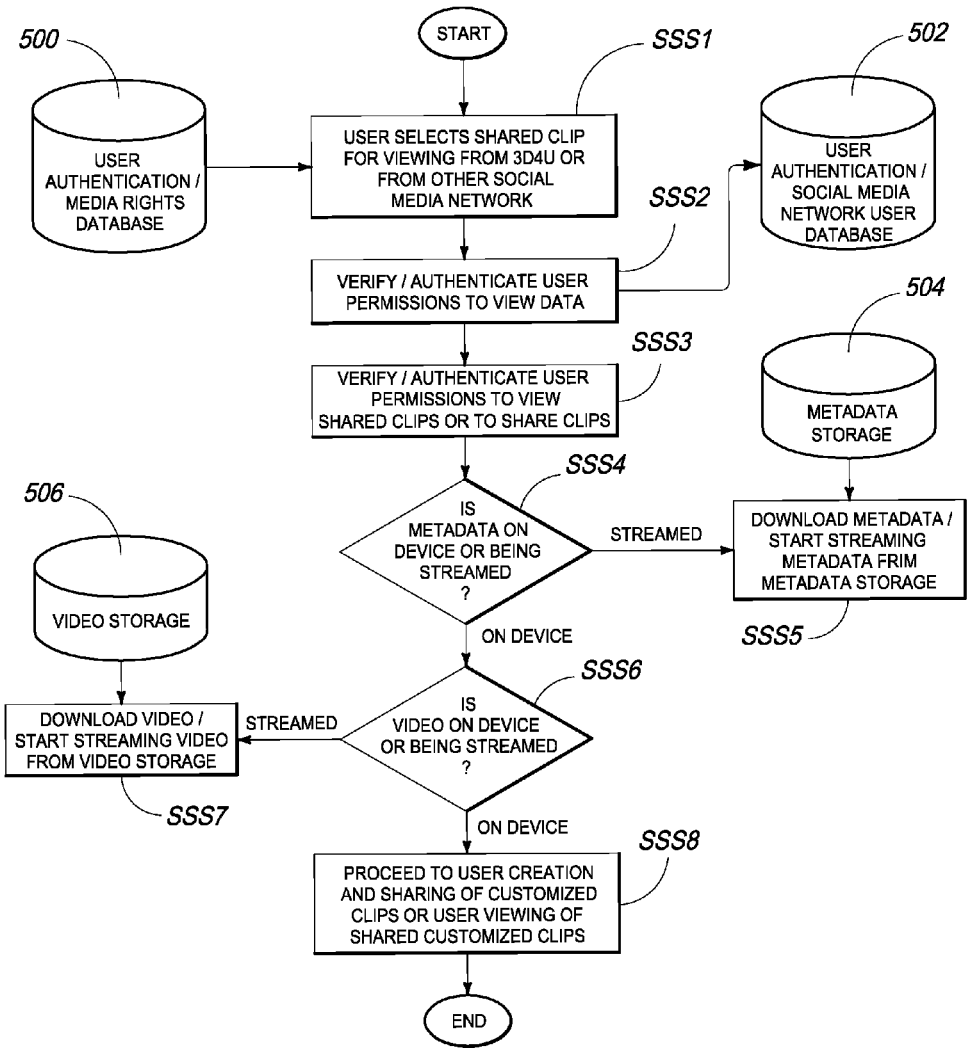
FIG. 5 is a flowchart showing the steps involved in playing the video clip which was posted on social media network using system 10 of FIG. 1.

FIG. 5 forms a process flow diagram showing the process for separate authentication for the 3D-4UShare social media network and the regular video feed and combining them to provide a complete authentication. More particularly, FIG. 5 illustrates logic processing used to separate authentication for the 3D-4UShare social media network and the regular video feed and combining them to provide a complete authentication.

In step "SSS1", a user selects a shared clip for viewing from 3D4U or from other social media networks such as Facebook®, Twitter®, etc. or in the 3D-4U app. The user selects the video clip which is presented as a link using visually perceptible medium. Various forms of a visually perceptible medium are envisioned, including links located within a user interface, a banner, a button, a clickable icon, a thumbnail, a clickable graphic, or a hypertext link located on the user interface. The Link points to a video shared by another user or the same user through the process shown in FIG. 2. The system communicates with the database 500 and verifies the permissions necessary for the user to view the basic video feed, irrespective of the metadata being shared. This involves normal authentication processes used by media companies (e.g. login in process, location based authentication, network based authentication, etc.). After performing Step "SSS1" and verifying the user's permission for viewing the video, the process proceeds to Step "SSS2".

In Step "SSS2", the process verifies the permissions of the user to be able to view 3D-4U shared clips or create clips to be shared through 3D-4UShare database 502. After performing Step "SSS2", the process proceeds to Step "SSS3".

In Step "SSS3", the process verifies both the permissions which were obtained in Step "SSS2" and Step "SSS3". After performing Step "SSS3", the process proceeds to Step "SSS4".

In step "SSS4", the process queries the device if the metadata is already on the device or if it is being streamed. After performing Step "SSS4", if the metadata is available on the device then the process proceeds to Step "SSS6" else the process proceeds to Step "SSS5".

In step "SSS5", the process downloads the metadata or starts streaming the metadata from the metadata storage database 504.

In step "SSS6", the process queries the device if the video is already on the device or if it is being streamed. After performing Step "SSS6", if the video is available on the device then the process proceeds to Step "SSS8" else the process proceeds to Step "SSS7".

In step "SSS7", the process downloads the video or starts streaming the video from the video storage database 506.

In step "SSS8", the process proceeds to the process of user creation and sharing of customized clips or to the process of user viewing of shared customized clips.

Figure 6:
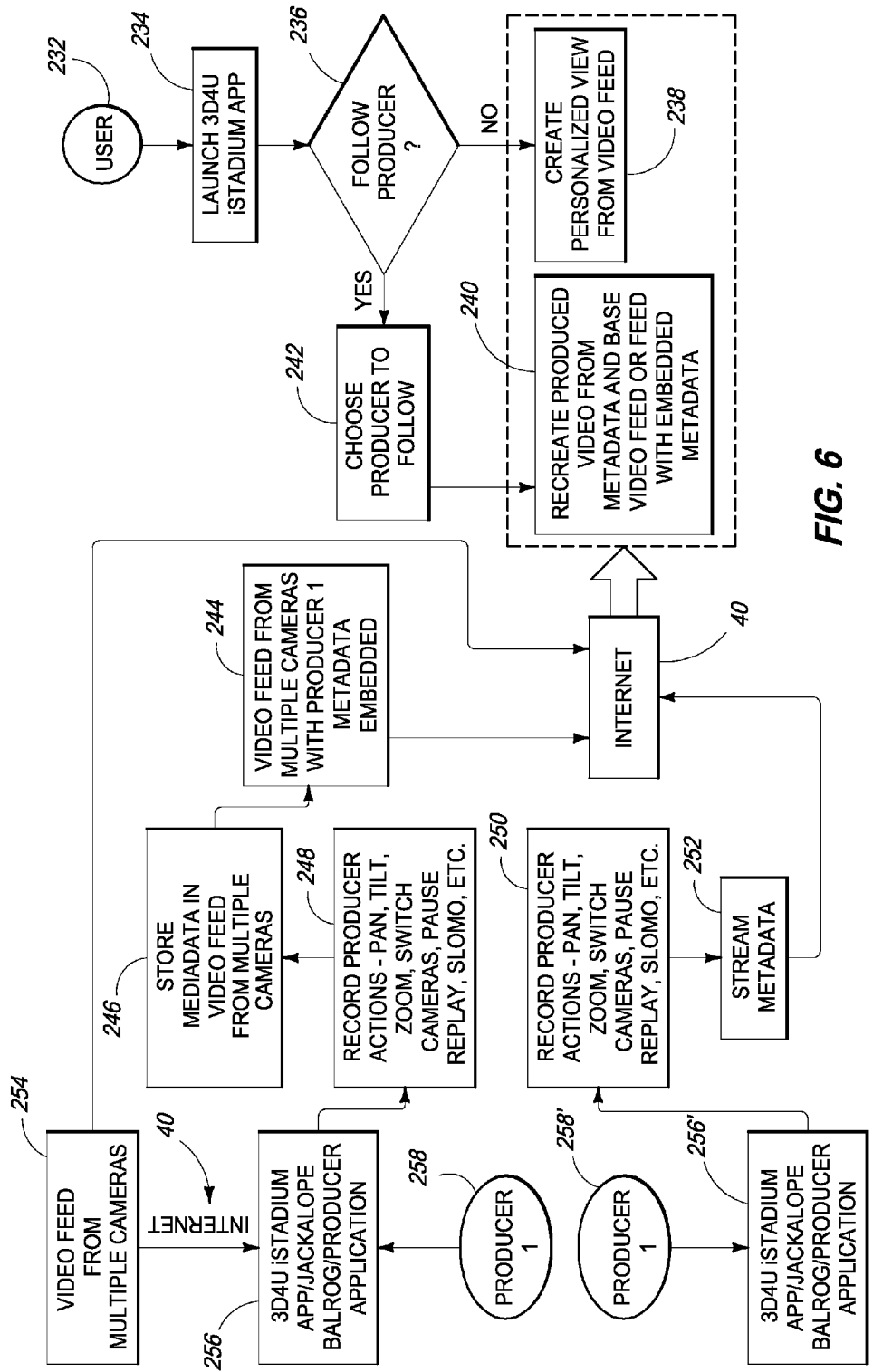
FIG. 6 is a flowchart showing the steps involved in handling a Video Playback State Changed Event triggered by the user.

FIG. 6 is a schematic diagram showing the process for feeding the video from multiple cameras to the user. More particularly, FIG. 6 illustrates logic processing used to create video feeds from multiple cameras and the user selecting the feed and viewing it. In block 250, the process records the user events performed by the producer. The events can include pan, tilt, zoom, switch cameras, pause, replay etc. After performing block 250, the process proceeds to block 252. In block 252, the metadata is streamed and made available via Internet 40 to the user. In block 254, the video feed from multiple cameras is received from the Internet 40. After performing block 254, the process proceeds to block 256. In block 256, the producer uses the 3D4U producer application to produce a video feed. After performing block 256, the process proceeds to block 250 and block 248. In block 248, the process records the user events performed by the producer. The events can include pan, tilt, zoom, switch cameras, pause, replay etc. After performing block 250, the process proceeds to block 246. In block 246, the process stores the media data in video feed provided from multiple cameras. After performing block 246, the process proceeds to block 244. In block 244, the process sends the video feed obtained from multiple cameras with the Producer 258 metadata embedded and makes it available through the Internet 40.

Figure 7:
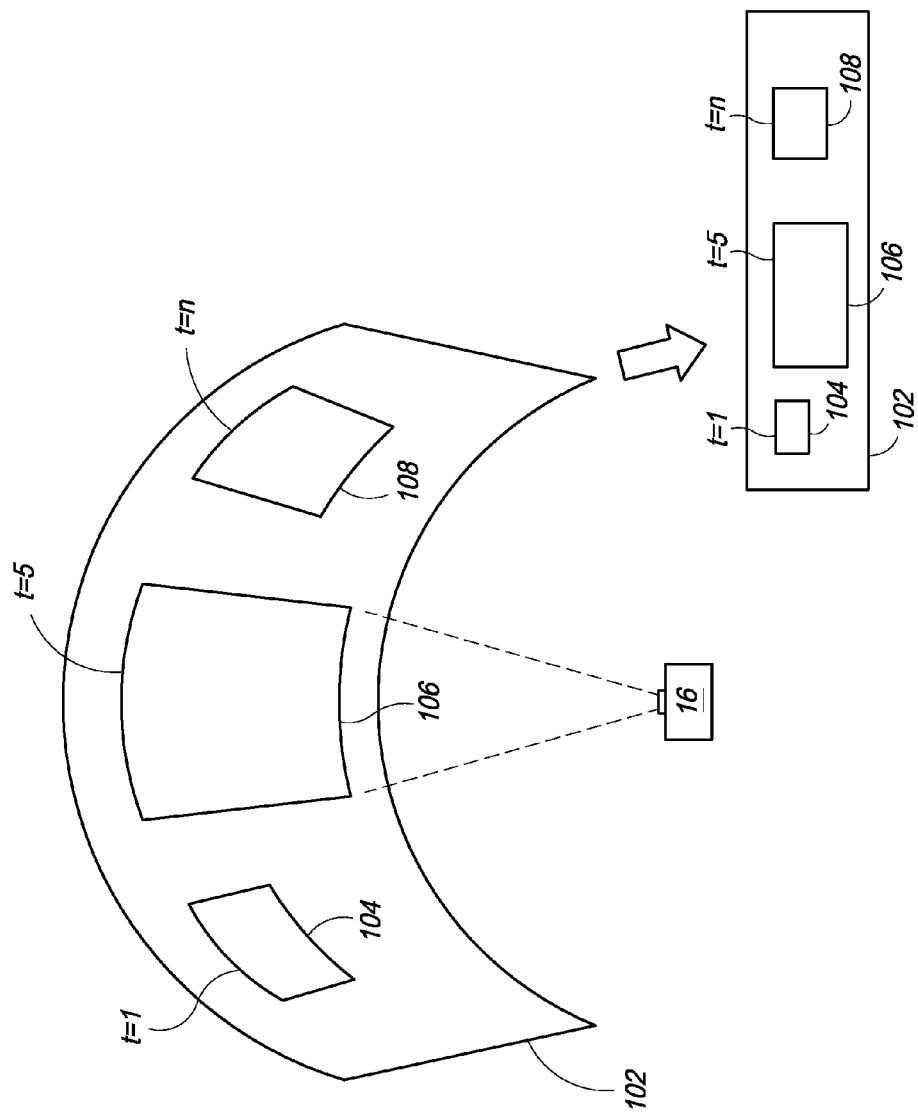
FIG. 7 is a simplified schematic diagram illustrating a camera array capture system for capturing video images used to create a panoramic and/or high resolution video feed that defines an image space that a user can capture as image sub-spaces within the image space (including the full image space) at a series of unique periods of time as either a full set or a subset having user determined direction and field-of-view from within the captured image space when generating a personal user video.

FIG. 7 is simplified schematic diagram of a 180 degree monoscopic (or stereoscopic pair) camera array 16 illustrating a field of view for a panoramic and/or high resolution video captured by camera array 16 (which includes an array of adjacent cameras having adjacent and contiguous fields of view to provide a resulting combined panoramic field of view). A panoramic image region 102 represents the image region (at a set radial distance from camera array 16) and represents the full panoramic video (or image) taken at from camera array 16 for any given point in time. Sub-video (or sub-image) 104 represents a user selected (through, zoom and image portion selection) video component (or image) that is a sub-set of image region 102 at time period t=1. At a later period, t=5, sub-video (or sub-image) 106 represents a user selected video component (or image) at a later time period t=5. At even later period, t=n, sub-video (or image) 108 represents a user selected video component (or image at an even later period t=n. In this way, a user is able to produce their own images (over time) from a video feed from camera 16 so as to provide a personal video from panoramic image region 102. At most, images 104, 106 and 108 can cover the entirety of image region 102 for any selected period of time.

FIG. 8 is a sample metadata file illustrating the metadata of the clip created by the system during the process of recording or creating a clip as shown in FIG. 3. Below is the description of how the FIG. X was being created during the process shown in FIG. 3.

The metadata file is first created in the memory and then the block A0 is added to the metadata in the Step "S2" of the process.

Block "A2" is created by the process for the data storage in Step "S3". In the same Step, the block A3 was created by the process using camera tag details and then A3 is added to A2. Then, the process gets the current play back time, creates A4 and A5 for the current play back time, and adds A4 and A5 to A2. The process also adds a default event ID along with a value to create A6 and A7 data storage which is then added to A2. The process gets the initial values for the offset, creates A8 using key and A9 using the value, and adds them to A2. The process gets the initial values for the playstate, creates A10 using key and A11 using the value, and adds them to A2. The process gets the initial values for the recorded device content transformation, creates A11 using key and A12 using the value, and adds them to A2. The process gets the version of the application, creates A13 using key and A14 using the value, and adds both of them to A2.

The process gets the video id of the full video which is being played, creates A15 using key and A16 using the value, and adds both of them to A2. The process gets the current zoom scale, creates A17 using key and A18 using the value, and adds both of them to A2.

Block "A1" is created by the process in the Step "S5". Then, Block "A2" is added to the Block "A1" and the Block "A1" is added to the Block "A0".

Block "A21" is created by the process in the Step "S9" when the user pans the video. In the same step, Block "A22" and Block "A23" are created by the process using the current play back time. Also, Block "A24" and Block "A25" are created by the process using the event id. Block "A26" and Block "A27" are created by the process in the Step "S14" using the offset values. Also, Block "A28" and Block "A29" are created by the process using duration of recording. So, the Block "A21" illustrates that a user event has occurred at 19.883273696 seconds with an event id=109 which corresponds to Pan with offset values (453.5, 0) and duration of recording was 1.7666667588055134. Block "A21" is added to the Block "A1" in the Step "S15".

Block "A30" is created by the process in the Step "S9" when the user pans the video. In the same step, Block "A31" and Block "A32" are created by the process using the current play back time. Also, Block "A33" and Block "A34" are created by the process using the event id. Block "A35" and Block "A36" are created by the process in the Step "S14" using the offset values. Also, Block "A37" and Block "A38" are created by the process using duration of recording. So, the Block "A30" illustrates that a user event has occurred at 19.883273696 seconds of the full video with an event id=109 which corresponds to Pan with offset values (457, 0) and duration of recording was 1.8000000938773155. Block "A30" is added to the Block "A1" in the Step "S15".

Block "A39" is created by the process in the Step "S9" when the user pans the video. In the same step, Block "A40" and Block "A41" are created by the process using the current play back time. Also, Block "A42" and Block "A43" are created by the process using the event id. Block "A44" and Block "A45" are created by the process in the Step "S14" using the offset values. Also, Block "A46" and Block "A47" are created by the process using duration of recording. So, the Block "A39" illustrates that a user event has occurred at 19.915203333000001 seconds of the full video with an event id=109 which corresponds to Pan with offset values (460.5, 0) and duration of recording was 1.8000000938773155. Block "A39" is added to the Block "A1" in the Step "S15".

Block "A48" is created by the process in the Step "S9" when the user zooms the video. In the same step, Block "A49" and Block "A50" are created by the process using the current play back time. Also, Block "A51" and Block "A52" are created by the process using the event id. Block "A53" and Block "A54" are created by the process in the Step "S13" using the offset values. In the same Step, Block "A55" and Block "A56" are created by the process using duration of recording value. Block "A57" and Block "A58" are created by the process using the zoom scale value. So, the Block "A48" illustrates that a user event has occurred at 23.910301570000001 seconds of the full video with an event id=100 which corresponds to zoom with offset values (1548.03, 335.527), zoom scale of 1.7527990341186523 and duration of recording was 5.4333336167037487. Block "A48" is added to the Block "A1" in the Step "S15".

Block "A59" is created by the process in the Step "S9" when the user zooms the video. In the same step, Block "A60" and Block "A61" are created by the process using the current play back time. Also, Block "A62" and Block "A63" are created by the process using the event id. Block "A64" and Block "A65" are created by the process in the Step "S13" using the offset values. In the same Step, Block "A66" and Block "A67" are created by the process using duration of recording value. Block "A68" and Block "A69" are created by the process using the zoom scale value. So, the Block "A59" illustrates that a user event has occurred at 23.942486532 seconds of the full video with an event id=100 which corresponds to zoom with offset values (1550.33, 336.157), zoom scale of 1.7550586462020874 and duration of recording was 5.46666669517755508. Block "A59" is added to the Block "A1" in the Step "S15".

Block "A70" is created by the process in the Step "S9" when the user zooms the video. In the same step, Block "A71" and Block "A72" are created by the process using the current play back time. Also, Block "A73" and Block "A74" are created by the process using the event id. Block "A75" and Block "A76" are created by the process in the Step "S13" using the offset values. In the same Step, Block "A77" and Block "A78" are created by the process using duration of recording value. Block "A79" and Block "A80" are created by the process using the zoom scale value. So, the Block "A70" illustrates that a user event has occurred at 23.974900081000001 seconds of the full video with an event id=100 which corresponds to zoom with offset values (1550.41, 336.268), zoom scale of 1.7553437948226929 and duration of recording was 5.500000286847353. Block "A70" is added to the Block "A1" in the Step "S15".

Block "A81" is created by the process in the Step "S9" when the user pauses the video. In the same step, Block "A82" and Block "A83" are created by the process using the current play back time. Also, Block "A84" and Block "A85" are created by the process using the event id. Block "A86" and Block "A87" are created by the process using duration of recording value. So, the Block "A81" illustrates that a user event has occurred at 25.072922040000002 seconds of the full video with an event id=101 which corresponds to pause and duration of recording was 6.5000003390014172. Block "A81" is added to the Block "A1" in the Step "S15".

Block "A88" is created by the process in the Step "S9" when the user stops the recording. In the same step, Block "A89" and Block "A90" are created by the process using the current play back time. Also, Block "A91" and Block "A92" are created by the process using the event id. Block "A93" and Block "A94" are created by the process using duration of recording value. So, the Block "A81" illustrates that a user event has occurred at 25.488877777777777 seconds of the full video with an event id=9999 which corresponds to stop recording and duration of recording was 8.2000004276633263. Block "A88" is added to the Block "A1" in the Step "S15".

A recording and producing apparatus is provided for recording a panoramic video of a real scene or panoramic image of a real scene (excluding computer generated scenes) and producing a regular video or image that fits standard aspect ratios of TVs and computer monitors and mobile devices by selecting a sub-set (sub-regions) of the panoramic video or panoramic image giving the viewer the feeling of controlling the camera pan, tilt, and zoom in the digital space. The video production is created from the panoramic image of video through a metadata set comprising at least one of pan, tilt, and zoom controls for controlling the virtual camera at specific timestamps of the video. The metadata set also consists of video transport control data comprising at least one of start time, end time, duration, and playback speed of transport events (pause, play, forward play, reverse play) and camera control events (pan, tilt, and zoom changes). In one case, the metadata set is transmitted as data embedded in the video or image data. In another case, the metadata set is transmitted as data separate from the transmission of the video data and the metadata and video data are synchronized using timestamp data in the video data with timestamp information in the metadata.

A recording and producing apparatus is provided for recording a panoramic video of a real scene or panoramic image of a real scene (excluding computer generated scenes) and producing a regular video or image that fits standard aspect ratios of televisions and computer monitors and mobile devices by interactively selecting a sub-set (sub-regions) of the panoramic video or panoramic image giving the viewer the feeling of controlling the camera pan, tilt, and zoom in the digital space. The apparatus includes a user interface a user interface for selecting the camera pan, tilt, and zoom to choose the sub region of the panoramic video or panoramic image being produced. The user interface is provided for defining video transport controls such as pause, play forward, play backward, and play speed. The video being produced is not created as a video clip comprising image or video data. The video being produced is stored as metadata comprising at least one of pan, tilt, and zoom controls for controlling the virtual camera at specific timestamps of the video. The stored metadata also consists of video transport control data comprising at least one of start time, end time, duration, and playback speed of transport events (pause, play, forward play, reverse play) and camera control events (pan, tilt, and zoom changes). The stored metadata is utilized in combination with the panoramic video or panoramic image to recreate the produced video. The panoramic video data is live streamed data, recorded data retrieved from hard disk, or buffered data in memory.

In one case, the metadata is created and utilized on the same video viewing device. In another case, the metadata is created on a first device and then utilized on a different second device. In some cases, the metadata is sent from first device and is transmitted as data separate from the transmission of the video data. In other cases, the metadata and the video data are synchronized on the second device using timestamp data in the video data with timestamp information in the metadata. In certain other cases, metadata that is sent from the first device is embedded into the video data sent to the second device.

An apparatus is providing including an input device, an output graphics device, a memory device, and one or more processors. The input device is provided in communication with the one or more processors. The output graphics device is provided in communication with the one or more processors. The memory device is provided in communication with the one or more processors. The memory has programs stored therein, the programs implemented through the one or more processors and designed to cause the computer to: 1) allow a user to view a video of a real scene; 2) allow the user to produce a regular video or image that fits standard aspect ratios of televisions and computer monitors and mobile devices by selecting a sub-set (sub-regions) of the panoramic video or panoramic image giving the viewer the feeling of controlling the camera pan, tilt, and zoom in the digital space (produced video); 3) simultaneously record the inputs of the user used to create the produced video as metadata using the one or more processors through the input device; and 4) allow a different user to automatically view the produced video ("reproduced video"). The reproduced video is created from the original video through the metadata set comprising at least one of pan, tilt, and zoom controls for controlling the virtual camera at specific timestamps of the video. The metadata set also consists of video transport control data comprising at least one of start time, end time, duration, and playback speed of transport events (pause, play, forward play, reverse play) and camera control events (pan, tilt, and zoom changes).

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A video production sharing apparatus, comprising:
a processor, and a memory, the memory having programs stored therein, the programs executed by the processor to cause the processor to:
access a panoramic video of a scene captured by a plurality of video cameras, each of the video cameras to capture a portion of the panoramic video from a different viewpoint;
manipulate a viewing perspective of the panoramic video with the input device controlled by a first user to render an individualized video, the manipulation of the viewing perspective comprising at least one of pan, tilt, zoom and change in temporal viewing direction and/or speed of playback of the panoramic video;
record the manipulation of the viewing perspective as metadata within a metadata structure, the metadata structure comprising interpretable code specifying at least a portion of the manipulation of the viewing perspective and usable to reproduce the individualized video, the metadata including control data to indicate at least one of a start time, end time, duration, playback speed, and camera control events including one or more of pan, tilt, and zoom; and
transfer the metadata structure to a server accessible to at least one client of a second user, the client to execute program code to interpret the metadata and reproduce the individualized video by retrieving the panoramic video from a network location specified in the metadata or in an external link and applying the manipulation of the viewing perspective of the panoramic video in accordance with the metadata.

2. The apparatus of 1 wherein the client of the second user comprises a processor, memory, and an output device, the memory having programs stored therein, the programs implemented through the processor and designed to cause the processor to: receive the metadata structure and panoramic video, generate for viewing at the client of the second user the individualized video by manipulating the rendition of the panoramic video by interpreting the metadata structure, and the individualized video to be rendered on the output device of the client of the second user.

3. The apparatus of claim 1 wherein the metadata structure comprises a computer-readable file containing text specifying the metadata.

4. The apparatus of claim 1 wherein the server comprises a social networking site on which the first user has an account, the second user registered as a friend of the first user on the social networking site and accessing the metadata structure by logging in to the social networking site.

5. The apparatus of claim 4, wherein the social networking site comprises a storage device to store the metadata structure and associate the metadata structure with the first user's account.

6. The apparatus of claim 1, wherein the panoramic video comprises a plurality of simultaneous video streams of the scene, each one of the simultaneous video streams captured from a unique viewing perspective by each of a plurality of uniquely positioned video cameras.

7. The apparatus of claim 1, wherein the plurality of video cameras are distributed about a location each having a unique viewing perspective.

8. The apparatus of claim 1, further comprising an Internet cloud-based data store configured to store the metadata structure.

9. A method for sharing a video production, comprising:
accessing a panoramic video of a scene captured by a plurality of video cameras, each of the video cameras to capture a portion of the panoramic video from a different viewpoint;
manipulating a viewing perspective of the panoramic video with an input device controlled by a first user to render an individualized video, the manipulation of the viewing perspective comprising at least one of pan, tilt, zoom and change in temporal viewing direction and/or speed of playback of the panoramic video;
capturing the manipulation of the viewing perspective as metadata within a metadata structure, the metadata structure comprising interpretable code specifying at least a portion of the manipulation of the viewing perspective and usable to reproduce the individualized video, the metadata including control data to indicate at least one of a start time, end time, duration, playback speed, and camera control events including one or more of pan, tilt, and zoom; and
transferring the metadata structure to a server accessible to at least one client of a second user, the client to execute program code to interpret the metadata and reproduce the individualized video by retrieving the panoramic video from a network location specified in the metadata or in an external link and applying the manipulation of the viewing perspective of the panoramic video in accordance with the metadata.

10. The method of claim 9 wherein the metadata structure comprises a computer-readable file containing text specifying the metadata.

11. The method of claim 10 wherein the program code to interpret the metadata comprises an application or browser plug-in executed on the client of the second user.

12. The method of claim 11, further comprising interpreting the text of the computer-readable file to reproduce the individualized video.

13. The method of claim 12, further comprising rendering the individualized video on an output device of the at least one computer.

14. The method of claim 9, wherein accessing comprises retrieving the panoramic video at a computer.

15. The method of claim 14, further comprising storing the panoramic video on the computer.

16. The method of claim 9, wherein the panoramic video stream comprises a plurality of video streams, each video stream captured from a different one of the video cameras, and manipulating viewing perspective comprises creating a viewing perspective using one or more of the plurality of video streams.

17. The method of claim 16, wherein a viewing perspective is generated by user input to manipulate one or more of the video streams to capture an image sub-space within an image space of each of the plurality of video streams.

18. The method of claim 17, wherein each image sub-space gives the second user of the client the feeling of controlling camera pan, tilt, and zoom in a digital space.

19. The method of claim 9, wherein manipulating the viewing perspective comprises at least one of pan, tilt, and zoom within a full image space of the panoramic video at specific timestamps.

20. The method of claim 16, wherein within each video stream generated from a respective one of the cameras, manipulating the viewing perspective of the respective video stream comprises at least one of pan, tilt, zoom, and change in temporal viewing direction and/or speed with an input device of at least one computer to generate the individualized video.

21. The method of claim 20, wherein the plurality of video streams enable one or more users via the at least one computer to perform both intra-camera navigation of each individual video stream and inter-camera navigation between respective video streams from each camera.

22. The apparatus of claim 7, wherein the processor is configured to: access each video stream from each camera, manipulate the viewing perspective within each video stream with the input device to generate the individualized video generated by navigation within the video stream of each camera.

23. The apparatus of claim 22, wherein the plurality of video streams enable one or more users via at least one computer to perform both intra-camera navigation of each individual video stream and inter-camera navigation between respective video streams from each camera.

* * * * *